United States Patent Office
2,921,018
Patented Jan. 12, 1960

2,921,018

METHOD FOR IMPROVING USED CRACKING CATALYSTS

Carl J. Helmers, Bartlesville, and Charles R. Turvey, Ponca City, Okla., assignors to Phillips Petroleum Company, a corporation of Delaware No Drawing. Continuation of application Serial No. 264,834, January 3, 1952. This application November 30, 1956, Serial No. 625,257

5 Claims. (Cl. 208—114)

This invention relates to a method for improving the selectivity of used catalytic cracking catalysts. In a more specific aspect this invention relates to a method for the reduction of the dehydrogenation properties of heavy metal contaminants which accumulate upon cracking catalysts.

This is a continuation of our copending application Serial No. 264,834, filed January 3, 1952, now abandoned.

In the usual fluid catalytic cracking process, the hydrocarbon feed material is cracked in a reactor in the presence of a fluidized catalyst. An acid activated clay such as acid activated bentonite (Filtrol D) is commonly employed as the catalyst in such cracking processes. When the activity index of the catalyst reaches a predetermined minimum indicating deactivation, the catalyst is withdrawn, regenerated in a regenerator, and returned to the reactor. In the regenerating step carbonaceous materials, deposited upon the catalyst in the cracking step, are burned off in the presence of a controlled amount of air. In a continuously operating process the catalyst is withdrawn from the reactor at a substantially constant rate, controlled so as to maintain the activity index of the catalyst at a predetermined level.

Continued use of a catalyst in the cracking and regeneration cycle ages the catalyst so that the activity index is gradually lowered to the point where regeneration will not activate the catalyst to the predetermined desired minimum. When this point is reached the catalyst is either discarded or reactivated with acid as in the original preparation of the catalyst. The activity index of a catalyst is sometimes maintained by withdrawing a portion of the used catalyst and replacing same with new catalyst.

In some instances another aging process occurs in the catalyst which is not remedied by the above described practice. This aging process is the result of the deposition of metal contaminants upon the catalyst as it is continuously recirculated through the cracking and regenerating steps of the process. The usual regeneration procedure does not remove these metallic contaminants and they accumulate upon the catalyst. The source of these metallic contaminants may be from erosion of the metallic equipment, however, they may also originate in the hydrocarbon feed stocks employed in the process. The fact that catalytic cracking units using hydrocarbon feed stocks derived from a particular area will suffer a rapid build-up of metallic contaminants whereas another unit using hydrocarbon feed stocks derived from a different area will not experience a detrimental build-up of metal indicates that a major portion of these metals originate in the petroleum furnishing the feed to the unit. Analysis of the hydrocarbon oils confirms these differences in metal content. Fractionation of the feed stock to segregate the oil low in metal content is reflected in low metal accumulation on the used cracking catalyst.

The principal metallic contaminants are believed to be compounds of iron, nickel, vanadium and other heavy metals. An analysis of a typical used catalyst showed 1.1 weight percent iron, 0.01 weight percent vanadium and 0.02 weight percent nickel. Copper is also sometimes found in a used catalyst. Although it is not known what compounds of these metals are present, it is believed that they are often present as sulfates, particularly when sulfur is also present in the hydrocarbon oil processed in the cracking unit.

The presence of these metallic contaminants on the catalyst causes side reactions to the conversion of heavier hydrocarbons into light hydrocarbons. These side reactions produce hydrogen and coke and these undesirable products result from destruction of hydrocarbons which otherwise would be converted into desirable hydrocarbon products. The coke produced is predominantly carbon, but it also includes high boiling polymers or condensation products low in hydrogen content. More important than the diversion of hydrocarbon feed stocks into these side reactions is the effect of these side reactions upon the operation of the cracking process.

The coke deposited upon the catalyst as a result of the presence of these metallic contaminants results in a shorter cracking cycle and places an extra load upon the regenerator. The capacity of a catalytic cracking unit is usually determined by the capacity of the regeneration facilities and therefore any overloading of the regenerator is directly reflected in a lowering of the capacity of the unit. Feed stock converted to coke is also reflected in a reduced yield of useful liquid products, particularly those in the gasoline boiling range.

The excess hydrogen resulting from the dehydrogenation occasioned by the presence of these metallic contaminants places an added load upon the vapor recovery system downstream from the cracking unit and also lowers the heating value, per cubic foot, of the residue gas resulting from the cracking unit.

Thus the carbon producing and hydrogen producing characteristics of a cracking catalyst is independent of the activity index of the catalyst so that a contaminated catalyst can be producing an amount of coke and hydrogen which will render the catalyst unusable while at the same time the catalyst will be a very active cracking catalyst. Thus the selectivity of the catalyst is impaired.

In at least one embodiment of this invention at least one of the following objects is obtained.

It is an object of this invention to provide a method for increasing the selectivity of an acid activated clay cracking catalyst.

It is another object of this invention to provide a method for controlling the detrimental effects of metallic contaminants which accumulate upon a cracking catalyst.

A more specific expression of the above object is to say that a method is provided for reducing the dehydrogenation and carbon forming activity of the metallic contaminants on a cracking catalyst.

It is a further object of this invention to provide a method for converting the metallic contaminants on a cracking catalyst, from the form in which they exist, into the corresponding compounds of phosphorus.

Other objects will be apparent to one skilled in the art upon reading the disclosure to this invention.

We have discovered a method for reducing the carbon and hydrogen producing characteristics of a used cracking catalyst which comprises converting the metallic contaminants on the catalyst into corresponding phosphorus compounds.

Thus according to the practice of the present invention a used cracking catalyst having a satisfactorily high activity index but also having undesirable carbon and hydrogen forming characteristics is treated with a sufficient quantity of phosphoric acid, such as orthophosphoric acid, to convert substantially all the metallic contaminants into metallic phosphate compounds. The quantity of phosphoric acid necessary is determined by the amount of metallic contaminants present on the catalyst. A concentration of approximately 2 weight percent of phosphoric acid with respect to the catalyst treated has been found to be usually sufficient.

After the acid treatment step the catalyst is dried at a temperature in the range 250 to 400° F. for a period of time in the range 18 to 24 hours to remove substantially all of the surface moisture and then heated, preferably in a non-oxidizing atmosphere, such as nitrogen atmosphere, to a temperature in the range 850 to 1050° F. The heating is then continued at the same temperature in an oxidizing atmosphere for a period of time in the range 1 to 8 hours to effect the apparent conversion of the metallic contaminants to either meta- or pyro-phosphates. The process of our invention is not limited to the use of phosphoric acid, but any means for converting the metals to meta- or pyro-phosphates will work equally well.

As a specific example, a used fluid cracking catalyst of acid activated bentonite (Filtrol D) was impregnated with 1.9 weight percent phosphorus (as phosphoric acid) by agitation with orthophosphoric acid, dried for 18 hours at 300° F., heated to 900° F. in an atmosphere of nitrogen, and then maintained at 900° F. for a period of one hour in an atmosphere of air. A comparison of the cracking results obtained with the treated and the untreated used catalyst are given in the table below.

|  | Activity Index | Carbon Factor | Hydrogen Factor |
| --- | --- | --- | --- |
| Treated Catalyst | 97 | 1.39 | 2.29 |
| Untreated Catalyst | 91 | 1.59 | 4.26 |

The activity index may be defined as the product of 100 times the ratio of the conversion obtained with the used catalyst and a standard feed material under standard conditions of temperature and pressure to that obtained with a standard catalyst and the same feed material and operating conditions. The standard catalyst is prepared by steam aging of a particular batch of Filtrol D to a surface area of 145 square meters per gram. The carbon and hydrogen factors are the ratios of the carbon and hydrogen produced by passing a standard feed material through the used catalyst under standard conditions of temperature and pressure to the carbon and hydrogen produced by passing the same feed material through the previously described standard catalyst under conditions producing the same degree of conversion. The data in this table clearly show the increase in activity index and the decrease in carbon and hydrogen factors to be obtained by the practice of our invention.

The increase noted in the activity index is an added advantage to be gained by the practice of the present invention. The reduction of the carbon and hydrogen factors of a used catalyst is not due to activation of the catalyst but is due to deactivation of the metallic contaminants which have accumulated upon the catalyst, since the new and used catalysts are compared at equal activity levels for carbon and hydrogen production. Thus the process of our invention is essentially one of a poisoning nature rather than a purification nature in as much as the contaminants are not removed but instead are rendered less active in producing the side reactions resulting in carbon and hydrogen formation.

Reasonable variations and modifications are possible within the scope of the disclosure to the invention, the essence of which, is that the carbon and hydrogen forming characteristics of an acid activated clay cracking catalyst can be reduced by treatment with phosphoric acid.

That which is claimed is:

1. The method of deactivating heavy metal contaminants which have accumulated upon a used cracking catalyst which comprises the steps of treating said used cracking catalyst with phosphoric acid; drying to remove excess moisture and heating in an oxidizing atmosphere so as to convert the heavy metal contaminants into metal phosphates whereby their activity with respect to producing carbon and hydrogen is reduced.

2. In a catalytic cracking process wherein hydrocarbons are contacted with a catalyst in a reaction zone under conditions so as to cause cracking of at least a portion of said hydrocarbons and wherein said catalyst is withdrawn to a regeneration zone wherein carbonaceous deposits are removed from said catalyst by combustion, the improvement which comprises the steps of withdrawing a portion of the catalyst from said regeneration zone; converting heavy metal contaminants accumulated thereon into metal phosphates by treating said catalyst with phosphoric acid and heating to a temperature in the range 850–1050° F. in an oxidizing atmosphere; and passing said catalyst to said reaction zone.

3. In a catalytic cracking process wherein hydrocarbons are contacted with an acid-activated clay catalyst in a reaction zone under conditions so as to cause cracking of at least a portion of said hydrocarbon and wherein said catalyst is withdrawn to a regeneration zone wherein carbonaceous deposits are removed from said satalyst by combustion, but heavy metal contaminants accumulated thereon are not removed, the improvement which comprises the steps of withdrawing a portion of said catalyst from said regeneration zone; contacting said regenerated catalyst with aqueous orthophosphoric acid so as to impregnate said catalyst with approximately a stoichiometric amount, with respect to the metal contaminants, of phosphorus as phosphoric acid; removing the remaining acid; drying said catalyst at a temperature in the range 250–400° F. for a period of time in the range 18–24 hours; heating said catalyst to a temperature in the range 850–1050° F. in a non-oxidizing atmosphere; continuing said heating at substantially the same temperature in an oxidizing atmosphere for a period of time in the range 1–8 hours; and passing said catalyst to said reaction zone.

4. In a catalytic cracking process wherein hydrocarbons are contacted with an acid-activated clay catalyst in a reaction zone under conditions so as to cause cracking of at least a portion of said hydrocarbon and wherein said catalyst is withdrawn to a regeneration zone wherein carbonaceous deposits are removed from said catalyst by combustion, but heavy metal contaminants accumulated thereon are not removed, the improvement which comprises the steps of withdrawing a portion of said catalyst from said regeneration zone; contacting said regenerated catalyst with aqueous orthophosphoric acid so as to impregnate said catalyst with approximately 2 weight percent of phosphorus as phosphoric acid; removing any remaining acid; drying said catalyst at a temperature of approximately 300° F. for about 18 hours; heating said catalyst to a temperature of about 900° F. in an atmosphere of nitrogen; continuing said heating at about 900° F. in air for about 1 hour; and passing said catalyst to said reaction zone.

5. A method for treating a used cracking catalyst which has become contaminated with heavy metals which comprises impregnating said catalyst with phosphoric acid; and heating said catalyst in an oxidizing atmosphere to a temperature of 850–1050° F.

References Cited in the file of this patent

UNITED STATES PATENTS

| | | |
| --- | --- | --- |
| 1,812,398 | Galle | June 30, 1931 |
| 2,129,693 | Houdry | Sept. 13, 1938 |
| 2,414,736 | Gray | Jan. 21, 1947 |
| 2,428,741 | Plank | Oct. 7, 1947 |
| 2,471,131 | Viles | May 24, 1949 |
| 2,668,798 | Plank | Feb. 9, 1954 |
| 2,682,496 | Richardson | June 29, 1954 |
| 2,713,560 | Morrell | July 19, 1955 |
| 2,758,097 | Doherty et al. | Aug. 7, 1956 |